W. LINDSAY.
CONVEYING APPARATUS.
APPLICATION FILED SEPT. 26, 1913.
1,232,700.
Patented July 10, 1917.
2 SHEETS—SHEET 2.
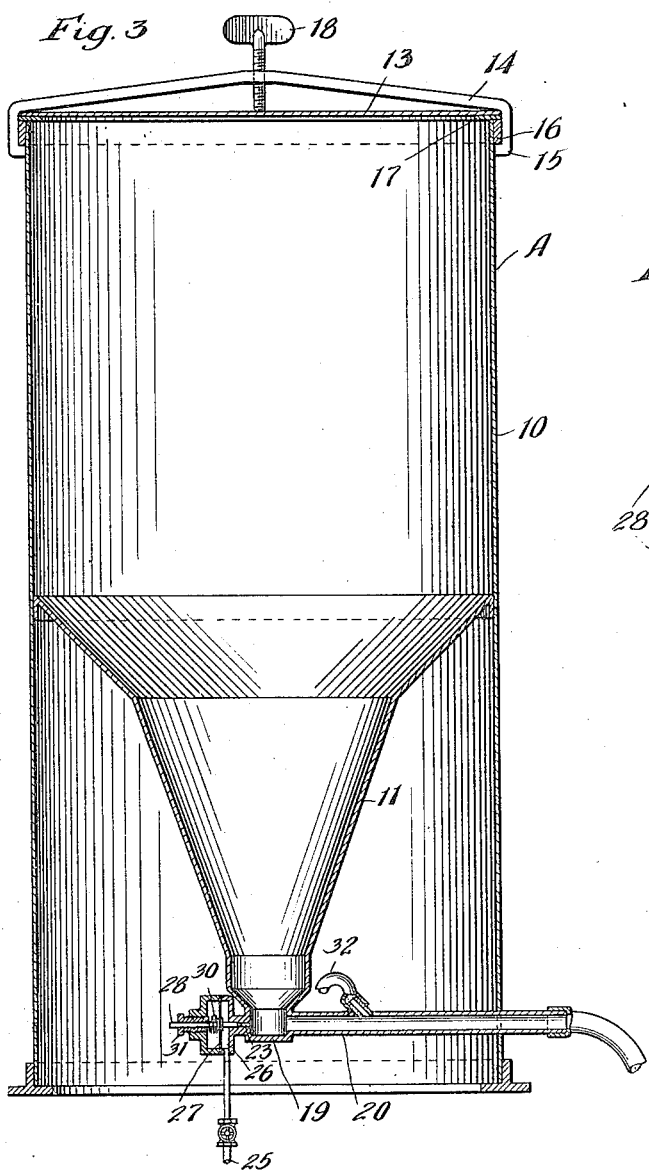
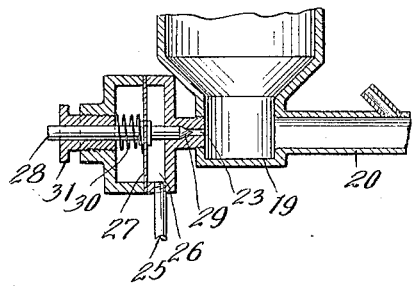
Witnesses:
Wm. Geiger
Esther Abrams
Inventor:
William Lindsay
By Munday, Evarts, Adcock & Clarke
Attys.

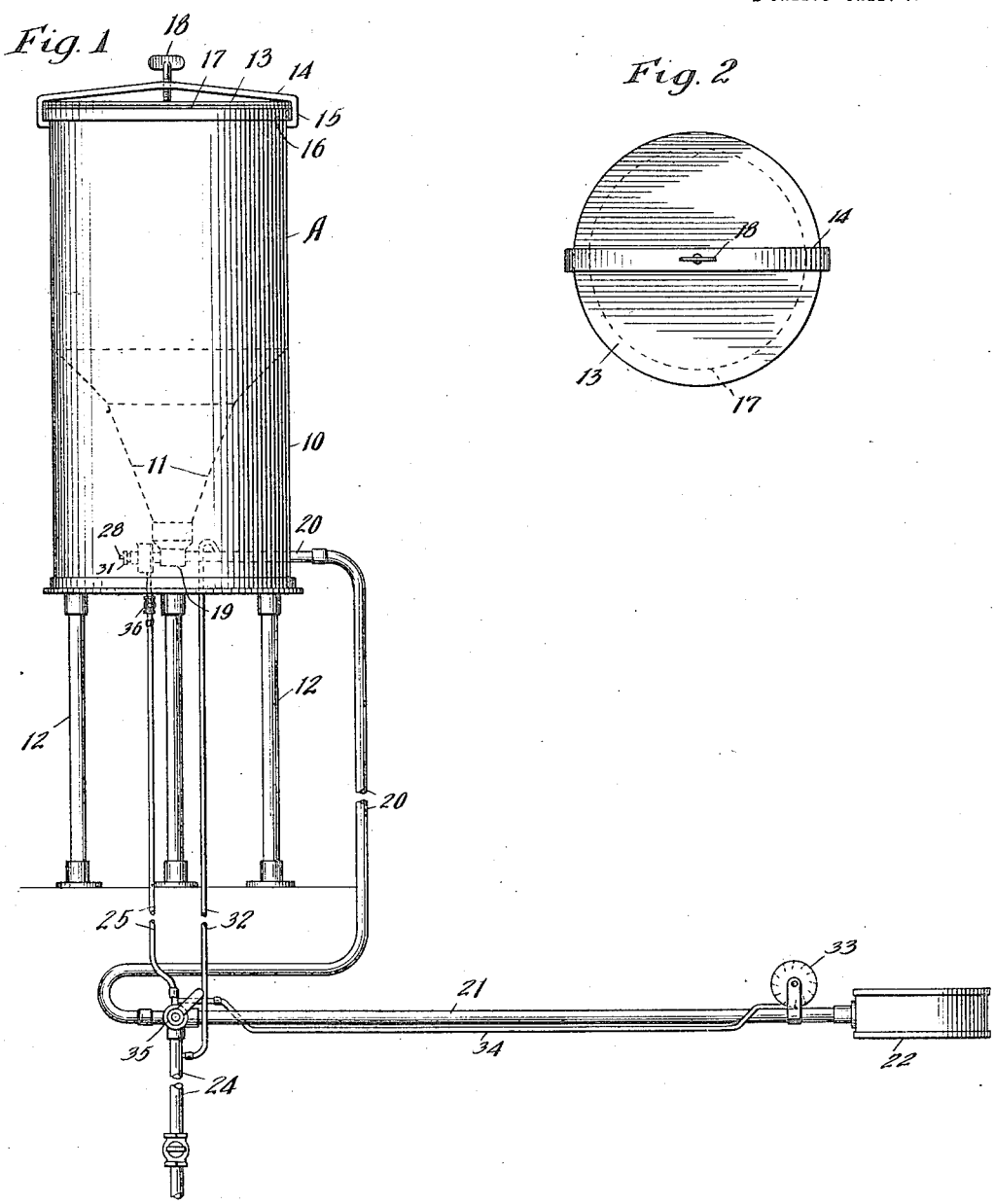
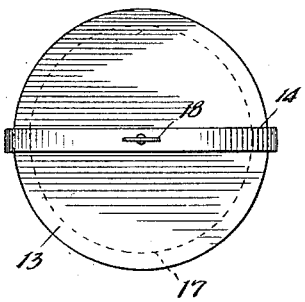

UNITED STATES PATENT OFFICE.

WILLIAM LINDSAY, OF CHICAGO, ILLINOIS, ASSIGNOR TO L. WOLFF MANUFACTURING COMPANY, OF CHICAGO, ILLINOIS, A CORPORATION OF ILLINOIS.

CONVEYING APPARATUS.

1,232,700.　　　Specification of Letters Patent.　　Patented July 10, 1917.

Application filed September 26, 1913. Serial No. 791,943.

*To all whom it may concern:*

Be it known that I, WILLIAM LINDSAY, a citizen of the United States, residing in Chicago, in the county of Cook and State of Illinois, have invented a new and useful Improvement in Conveying Apparatus, of which the following is a specification.

This invention relates to improvements in conveying apparatus and more particularly to apparatus for conveying the powder which is used to enamel iron ware from a storage tank to a sifter or dredge and is in the nature of an improvement on the device shown in my copending application Serial No. 714,491, filed August 12, 1912, for improvements in enameling powder distributer.

One object of the invention is to provide a simple mechanism, having few movable parts, for conveying enameling powder from a storage vessel or tank along a conveyer pipe or tube to a sifter or dredge.

Another object of the invention is to employ pneumatic means which not only serve to push or propel the enameling powder along the conveyer pipe but which also serves to agitate and loosen the powder in the storage tank.

The invention furthermore consists in the improvements in the parts and devices and in the novel combination of the parts and devices as herein shown, described or claimed.

In the drawing forming a part of this specification, Figure 1 is a side elevation of a structure embodying my improvements and showing also one form of sifter or dredge with which it is adapted to be used. Fig. 2 is a top plan view of the storage tank or vessel shown in Fig. 1. Fig. 3 is an enlarged, vertical, diametrical, sectional view of the storage tank proper and Fig. 4 is a detail enlarged view showing more particularly the arrangement of the pneumatic nozzle and valve at the lower end of the storage tank.

In said drawing the storage tank or vessel proper is designated by the reference A and the same comprises an outer cylindrical section 10 having a tapered or conical section 11 secured to the interior thereof. The tank 10 is supported on suitable standards 12 and a cover 13 is provided which is adapted to be firmly clamped and sealed to the top of the tank 10 by a clamp bar 14 having inturned flanges 15 engaging the under side of an annular rim 16 secured to the top of the tank. A sealing gasket 17 is provided and a pressure screw 18 is threaded through the clamp bar 14 to regulate the pressure of the cover on the tank 10.

The lower end of the conical section 11 merges into a relatively small cylindrical chamber 19, the interior of said chamber being in communication with a conveyer pipe 20 which extends and is connected to one end of a hollow handle 21 having a sifter or dredge 22 at its other end. Mounted in the chamber 19 is a nozzle 23 which is adapted to project a stream of compressed air transversely across the chamber 19 in a direction toward the conveyer pipe 20. The compressed air is supplied from any suitable source (not shown) by a pipe 24 and pipe 25, the latter communicating with the interior of a chamber 26 in which is mounted a flexible diaphragm 27 having secured thereto a rod 28, the inner end 29 of which forms a needle valve controlling the nozzle 23. The diaphragm 27 is yieldingly backed by a coiled spring 30, the tension of which may be adjusted by a threaded sleeve 31, see Fig. 4. This arrangement permits the delivery of compressed air to the part 19 under pressure variable with the requirements. When little resistance is offered, the pressure is reduced by the spring moving the needle valve to partially close the aperture, and should the passage clog more compressed air will be admitted to clear it. To assist in conveying the powder along the pipe 20 compressed air may be introduced at any point therealong, as by means of pipe 32. As is well known, dredges used for sifting enameling powder are generally given a vibratory motion by some form of motor, and in the drawing I have shown an air motor 33 which receives compressed air from a pipe 34. The supply of air to the nozzle 23 and to the motor 33 is preferably controlled by a valve 35 attached to the handle of the dredge. Another controlling valve is provided in the pipe 25 to regulate the jet through the nozzle 23, said valve being shown at 36.

The operation is as follows: The powder used for enameling iron ware is very heavy and has a tendency to pack solid, as is well known. But by locating the nozzle as herein shown and described, the compressed air issuing therefrom will force the powder or other material across the chamber 19 into the conveyer pipe, and due to the back pressure from the material in the conveyer pipe, some of the compressed air issuing from the nozzle 23 will force itself up through the enameling powder and agitate and loosen the same. By keeping the tank sealed the pressure on the top of the powder therein and across the bottom thereof, will automatically regulate itself. In actual practice, it is found that the compressed air which passes up through the material in the tank causes the latter to have the appearance of a "boiling" action. The jet by which the powder is fed along the conveyer pipe is regulated by the valve 36, and, as will be understood, the powder is fed substantially in a mass and not in a finely separated or floating condition, the air pressure being always such that it propels the powder with a gentle and easy motion.

Although I have herein shown and described what I now consider the preferred embodiment of my improvement, yet it will be understood that various changes and modifications may be made without departing from the spirit of the invention, and all such changes and modifications are contemplated as come within the scope of the claims appended hereto.

I claim:—

1. A conveying and distributing apparatus for enameling powder and the like comprising in combination: a storage vessel having a relatively small chamber at the bottom thereof into which the material is adapted to gravitate; a conveyer pipe leading from said chamber; a nozzle adapted to project a jet of compressed air across said chamber toward and into the conveyer pipe; a compressed air supply pipe leading to said nozzle; and adjustable means automatically controlling the supply of compressed air to the nozzle to thereby vary the force of the air jet, to maintain substantially an even ejectment of material, substantially as specified.

2. A conveying and distributing apparatus for enameling powder and the like comprising in combination: a storage vessel having a laterally extending outlet at one side and a laterally extending compressed air inlet at the other, a valve controlling said inlet, and yielding means for operating said valve, said yielding means being acted upon by the compressed air to automatically control the opening in accordance with the resistance offered to entering compressed air.

3. A conveying and distributing apparatus for enameling powder and the like comprising in combination: a sealed storage tank having a chamber at the bottom thereof; a conveyer pipe leading from said chamber; a nozzle located opposite said conveyer pipe and adapted to project compressed air across said chamber to thereby feed the material into the conveyer pipe; a spring-governed needle valve adapted to control said nozzle; and adjustable means to regulate the spring tension on said valve, substantially as specified.

Signed this 23rd day of September, 1913, in the presence of two subscribing witnesses.

WILLIAM LINDSAY.

Witnesses:
 JOSEPH HARRIS,
 JOHN H. GAVIN.